US012781755B2

(12) United States Patent
Hilliard

(10) Patent No.: US 12,781,755 B2
(45) Date of Patent: Nov. 3, 2026

(54) WATERLESS GLAND ASSEMBLY FOR ROTATING EQUIPMENT

(71) Applicant: Timothy Neal Hilliard, Tucson, AZ (US)

(72) Inventor: Timothy Neal Hilliard, Tucson, AZ (US)

( * ) Notice: Subject to any disclaimer, the term of this patent is extended or adjusted under 35 U.S.C. 154(b) by 78 days.

(21) Appl. No.: 18/764,736

(22) Filed: Jul. 5, 2024

(65) Prior Publication Data

US 2024/0360836 A1 Oct. 31, 2024

Related U.S. Application Data

(63) Continuation of application No. 17/300,585, filed on Aug. 26, 2021, now Pat. No. 12,085,087.

(60) Provisional application No. 63/103,850, filed on Aug. 27, 2020.

(51) Int. Cl.
*F04D 29/08* (2006.01)
*F16J 15/18* (2006.01)

(52) U.S. Cl.
CPC ............ *F04D 29/086* (2013.01); *F16J 15/18* (2013.01); *F16J 15/181* (2013.01)

(58) Field of Classification Search
CPC .......... F04D 29/086; F04D 29/102–146; F16J 15/18; F16J 15/181; F16J 15/183
USPC .......................................... 277/516; 415/230
See application file for complete search history.

(56) References Cited

U.S. PATENT DOCUMENTS

| | | | | |
|---|---|---|---|---|
| 1,528,721 | A * | 3/1925 | Yeip | F16J 15/18 277/510 |
| 2,670,973 | A * | 3/1954 | Ginther | F04D 29/128 277/408 |
| 2,802,679 | A * | 8/1957 | Taltavall, Jr. | F16J 15/3496 277/408 |
| 4,386,786 | A * | 6/1983 | Agrama | F16J 15/004 277/411 |
| 4,439,096 | A * | 3/1984 | Rockwood | F04D 29/126 415/230 |
| 5,112,039 | A * | 5/1992 | Walker | F16J 15/344 277/390 |
| 5,647,598 | A * | 7/1997 | Vaudolon | F16J 15/183 277/516 |
| 6,375,414 | B1 * | 4/2002 | Delaney | F16J 15/18 415/113 |
| 12,085,087 | B1 * | 9/2024 | Hilliard | F04D 29/086 |

* cited by examiner

*Primary Examiner* — Charles G Freay
*Assistant Examiner* — Joseph S. Herrmann
(74) *Attorney, Agent, or Firm* — Accelerate IP LLC

(57) ABSTRACT

A self-aligning, self-lubricated waterless-gland assembly disposed about a rotatable shaft between a process side and an atmosphere side, comprising a shaft-sleeve disposed about, contacting, and rotatable with the shaft, an annular case connected to and rotatable with the shaft-sleeve, and a stationary elastomeric boot member disposed about the shaft-sleeve, substantially filling the annular case and arranged to form a sealing interface. The waterless-gland assembly is applicable to devices whereby a fluid is movable between an inlet and an outlet.

20 Claims, 17 Drawing Sheets

4

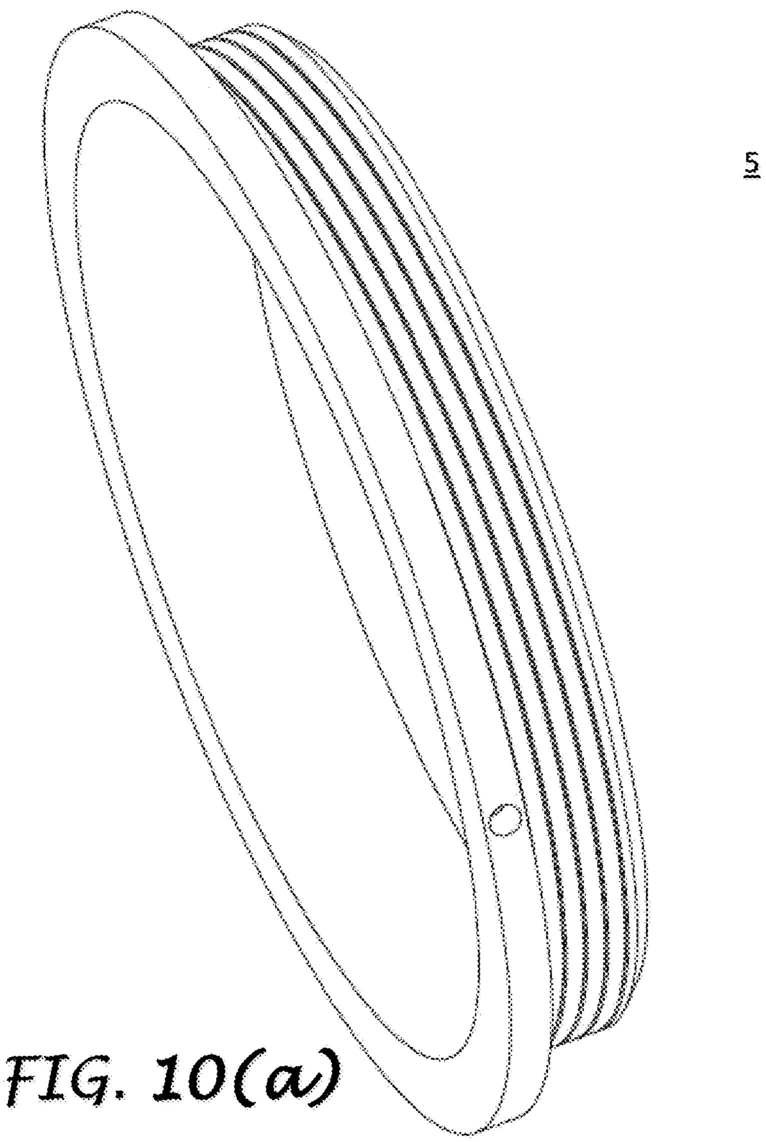
FIG. 10(a)
FIG. 10(b)
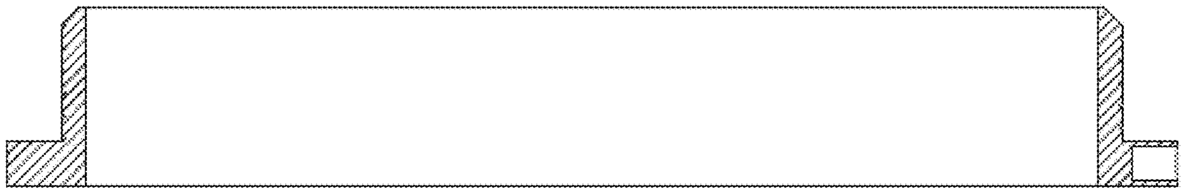

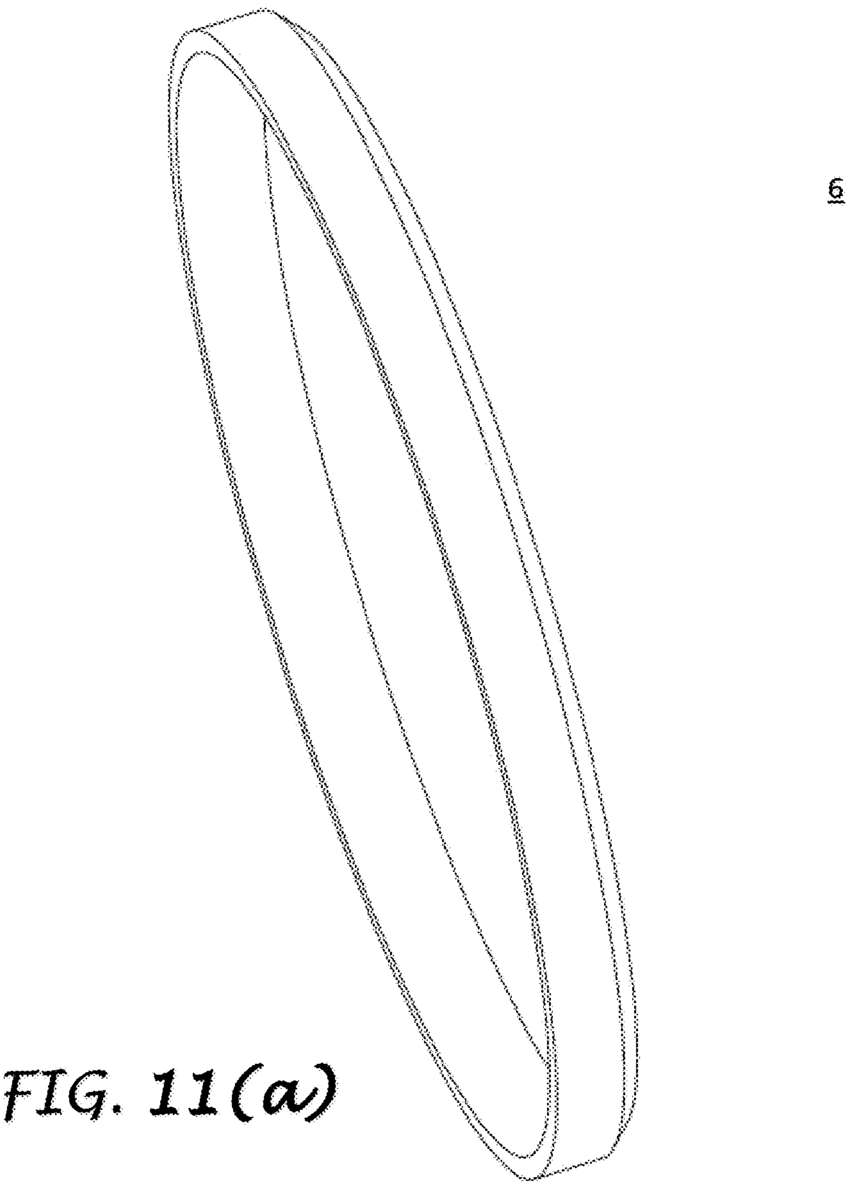
FIG. 11(a)
FIG. 11(b)
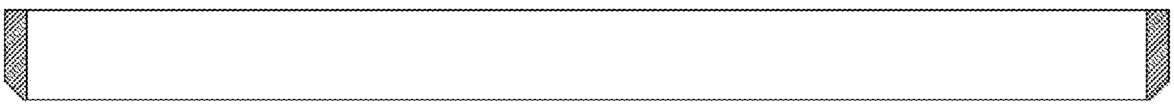

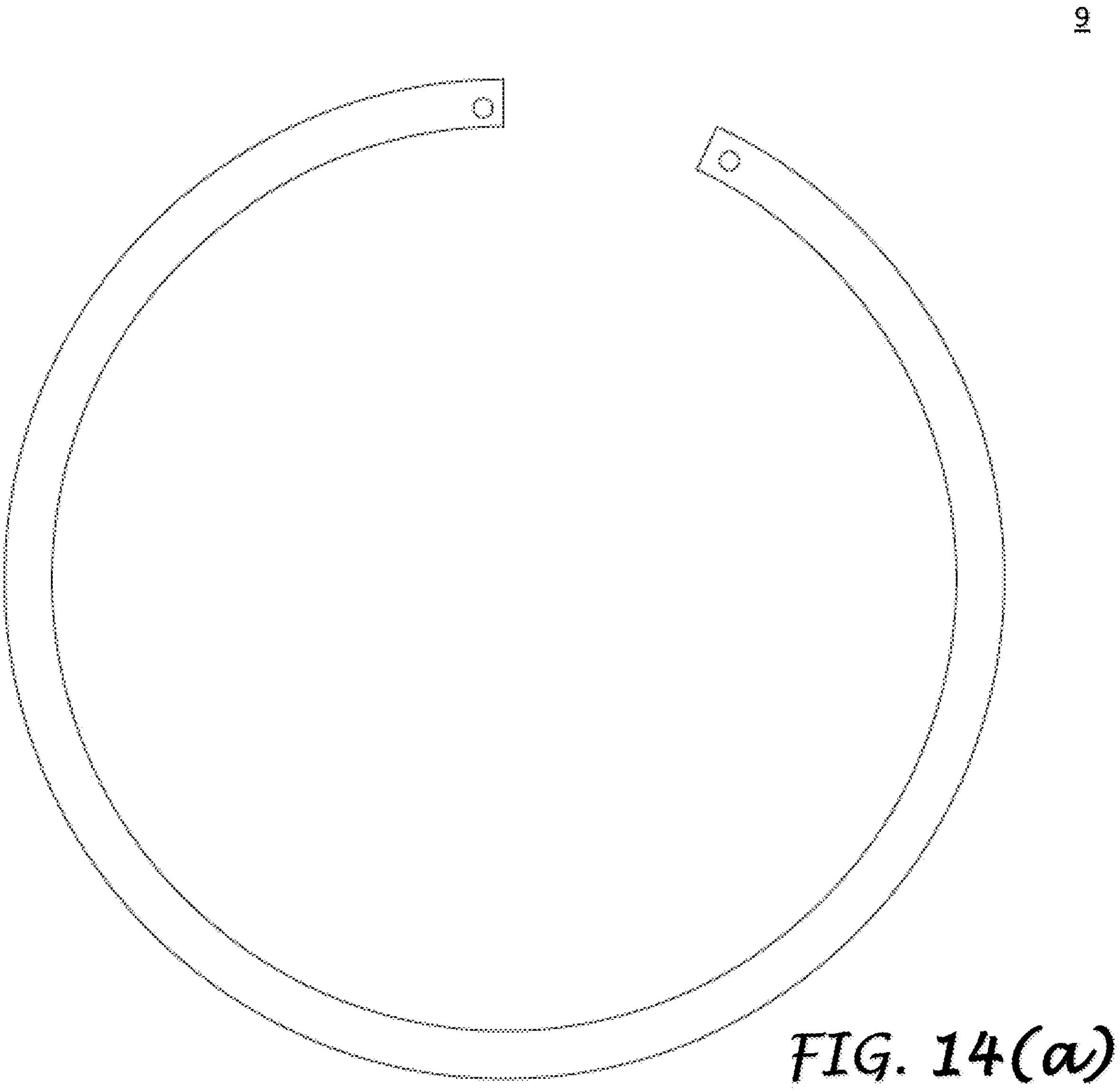
FIG. 14(a)
FIG. 14(b)

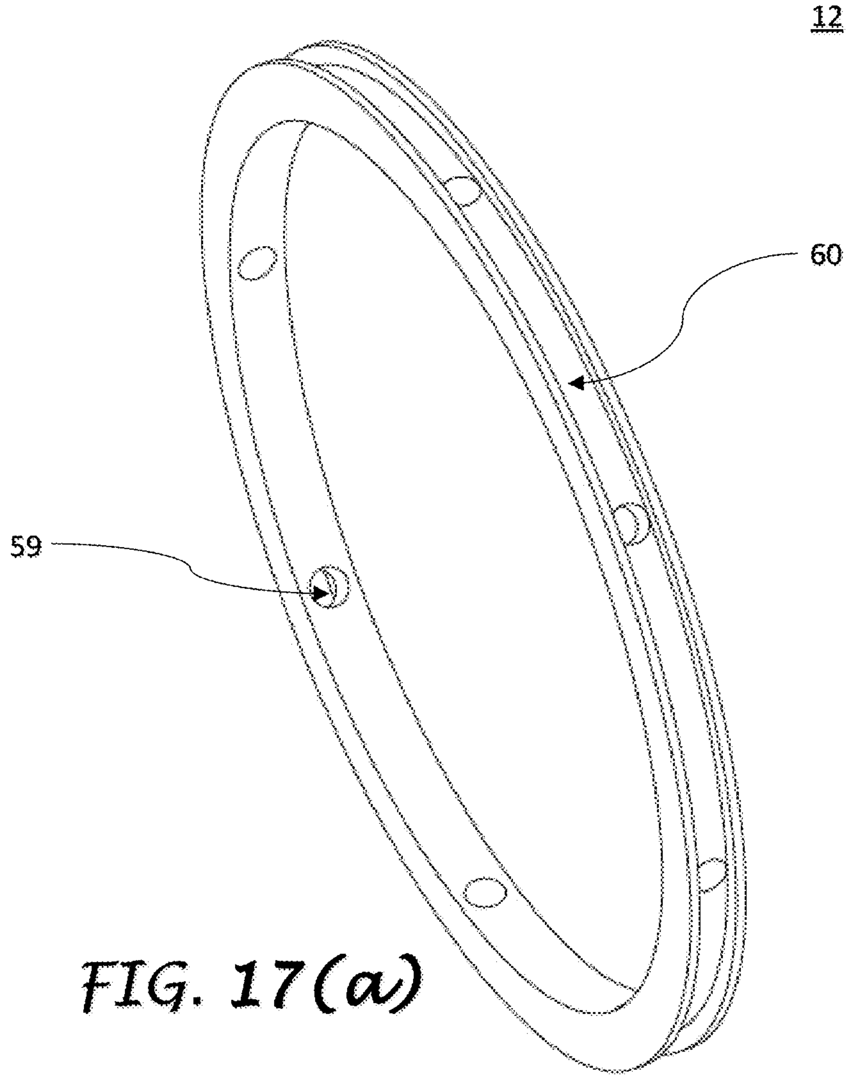
FIG. 17(a)
FIG. 17(b)
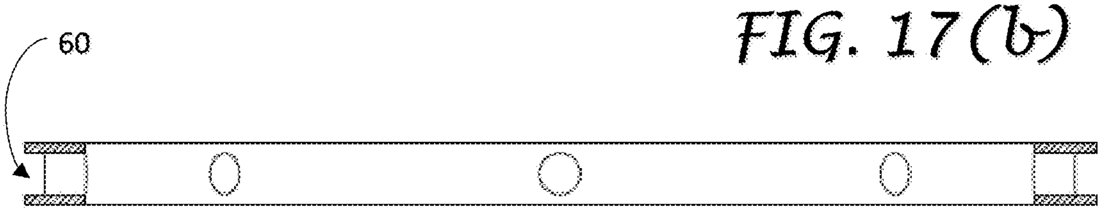

WATERLESS GLAND ASSEMBLY FOR ROTATING EQUIPMENT

CROSS-REFERENCE TO RELATED APPLICATIONS

This application is a continuation of U.S. application Ser. No. 17/300,585 filed Aug. 26, 2021, which claims the benefit of U.S. Provisional Patent Application No. 63/103,850 having a filing date of Aug. 27, 2020, each of which is incorporated by reference in its entirety, including all appendices, as if fully set forth herein.

BACKGROUND

Rotating equipment such as pumps, compressors, blowers and similar devices are prevalent throughout a number of industries such as mining, chemical processing and commodity handling.

In one example, a centrifugal pump converts rotational kinetic energy of a component within the pump to the hydrodynamic energy of a fluid. Specifically, an impeller is rotated by an engine, a turbine, an electric motor or the like. The impeller interacts with a fluid so as to draw the fluid into the pump at an inlet end, to accelerate the fluid as it traverses the pump, and to discharge the fluid at an outlet end.

A characteristic common to all applications is the penetration of a rotating shaft member through a housing or similar enclosure. The location where the rotating shaft penetrates the housing or enclosure provides a pathway for both egress of any lubricant or similar fluids carried by the housing or enclosure and the ingress of environmental contaminants into the housing or enclosure. One or more sealing-systems may be used to provide a shaft-seal that prevents the egress of lubricants and the ingress of contaminants. Sealing-systems used in services that includes slurries or similar abrasive materials typically have a limited operating life, are maintenance intensive requiring weekly adjustments and use seal, flush-systems that are costly, maintenance intensive and environmentally wasteful.

The most common slurry sealing method in the mining and mineral-processing industry is compressed packing with fresh, flush-water (shown in FIG. 1), which has been used to seal pump-shafts since the 1800's. Packing consists of specifically engineered, square-braided (rope) which is placed in rings around the shaft and then compressed to reduce the leakage from the pump. The packing must be flushed with clean water to keep it cool and lubricated. Large, slurry-pumps require 2-40 gallon (7.5-150 liters) per minute of fresh, flush-water. Some mines have so depleted their local groundwater that they have needed to import water from surrounding areas. Some of this clean, flush-water enters the process liquid causing product-dilution and some of the flush-water goes down the floor drain. In addition, the slurry gradually impregnates the stuffing material and erodes the shaft-sleeve creating even larger, leakage-paths until the assembly becomes non-functional requiring that pump be taken out of service to rebuild the seal-assembly.

Accordingly, what is required is a waterless-gland assembly that effectively prevents a slurry, originating in the process-side of a pump from reaching the atmosphere-side of said pump for a period of months, and be able to do that without requiring fresh, flush-water flow or maintenance. These are the needs addressed by this inventive Waterless-gland assembly Patent.

Advantages and Objectives

One advantage of the invention in its preferred embodiments is to eliminate the need for seal flush-water.

Another advantage of the invention in its preferred embodiments is to eliminate the need for mechanical packing adjustments.

Another advantage of the invention in its preferred embodiments is that it's a self-aligning gland design which ensures gland alignment with the pump-shaft and stuffing-box.

Another advantage of the invention in its preferred embodiments is the elimination of time-consuming installations, alignments and repacking procedures.

Another advantage of the invention in its preferred embodiments is to eliminate impellor calcification and scaling problems resulting from the introduction of a lower PH flush-water into the impellor-housing.

Another advantage of the invention in its preferred embodiments is that it installs in most slurry pumps with no modifications to OEM Equipment.

Another advantage of the invention in its preferred embodiments is that this waterless-gland assembly can withstand pump-cavitation, pressure changes, hard shut-downs and a wide range of shaft-speeds.

Another advantage of the invention in its preferred embodiments is that the waterless-gland assembly is lubricated from gland, cartridge-porting, thus eliminating the use of any porting from the OEM stuffing-box.

Another advantage of the invention in its preferred embodiments is that this waterless-gland assembly is a sealed cartridge, complete with no adjustments aside from the initial, axial-adjustment during installation.

Another advantage of the invention in its preferred embodiments is that it uses automated, grease-feeders that will provide the necessary lubrication for the gland without maintenance.

REFERENCE NUMERALS (26) Exemplary Stuffing-box bore shoulder mating surface
(27) Exemplary pump drive-shaft annular sleeve mating-surface
(28) Exemplary Pump drive-shaft
(29) Process-Side
(30) Stuffing-box throat (slurry passage)
(31) Primary gland-body O-ring cavity
(32) Atmosphere-side alignment-bushing radial-interface
(33) Primary gland-body anti-rotational, shoulder-bolt cavity
(34) Annular boot-keeper anti-rotational, shoulder-bolt
(35) Labyrinth-housing
(36) Primary shaft-sleeve annular receptacle (radial labyrinth cavity)
(37) Axial-adjustment cavity
(38) Primary shaft-sleeve compression sealing-surface
(39) Annular boot-keeper anti-rotational, shoulder-bolt cavity
(40) Primary gland-body bore-fitting surface
(41) Primary shaft-sleeve impellor mating-surface
(42) Primary gland-body sealing-surface
(43) Lantern-ring grease feedthrough-ports
(44) Process-side alignment-bushing internal, mating-surface
(45) Primary, gland-body O-ring
(46) Annular boot-keeper compression-ring inner, mating-surface
(48) Annular boot-keeper compression-surface (49) Annular boot-keeper compression-ring, axial O-ring
(50) Labyrinth-housing, radial clearance-cavity
(51) Elastomeric-boot, radial-clearance cavity
(52) Atmosphere-side alignment-bushing axial, compression-surface
(53) Waterless-gland assembly process-side slurry-throat
(54) Primary gland-body flange bolt-circle
(55) Primary gland-body, threaded-bolt-circle
(56) CrN+DLC film
(57) Threaded grease-port
(58) Pressurized grease-feedthrough
(60) Lantern-ring radial grease-cavity
(61) Shaft-sleeve radial-extension
(62) Primary shaft-sleeve pump-shaft clearance-cavity
(63) Pump-shaft mating-surface of the primary shaft-sleeve
(64) Primary shaft-sleeve atmosphere-side axial, compression-surface
(66) Primary gland-body counter-bore
(67) Annular boot-keeper compression-ring locating-shoulder
(68) Residual slurry-barrier cavity
*Note: Numbers 25, 47, 58 & 65 will not be used*

BRIEF DESCRIPTION OF THE DRAWINGS

Features and advantages of various embodiments of the claimed subject matter will become apparent as the following detailed description proceeds, and upon reference to the drawings, wherein like numerals designate like parts and in which:

FIG. 8C is a perspective view of a primary shaft sleeve of the invention in its first preferred embodiment;

FIG. 10A is A a perspective view of an annular boot-keeper of the invention in its first preferred embodiment;

FIG. 10B is a side-sectional view of an annular boot-keeper of the invention in its first preferred embodiment;

FIG. 11A is a perspective view of a boot-keeper annular boot-keeper compression ring of the invention in its first preferred embodiment;

FIG. 11B is a side-sectional view of a boot-keeper annular boot-keeper compression ring of the invention in its first preferred embodiment;

FIG. 14A is a top view of a boot-keeper retaining ring of the invention in its first preferred embodiment;

FIG. 14B is a side view of a boot-keeper retaining ring of the invention in its first preferred embodiment;

FIG. 17A is a perspective view of a lantern ring of the invention in its first preferred embodiment;

FIG. 17B is a side-sectional view of a lantern ring of the invention in its first preferred embodiment;

DETAILED DESCRIPTION OF THE INVENTION

In accordance with the first preferred embodiment, a rotary sealing system comprising a non-traditional sealing design useful for preventing leakage along a rotating shaft, is disclosed in conjunction with FIGS. 1-17B While aspects of the embodied cartridge type slurry sealing system may be realized in a variety of scaling systems, it is found in the present invention that certain preferred features and manufacturing methods are used to provide a superior sealing system.

Figure 1:
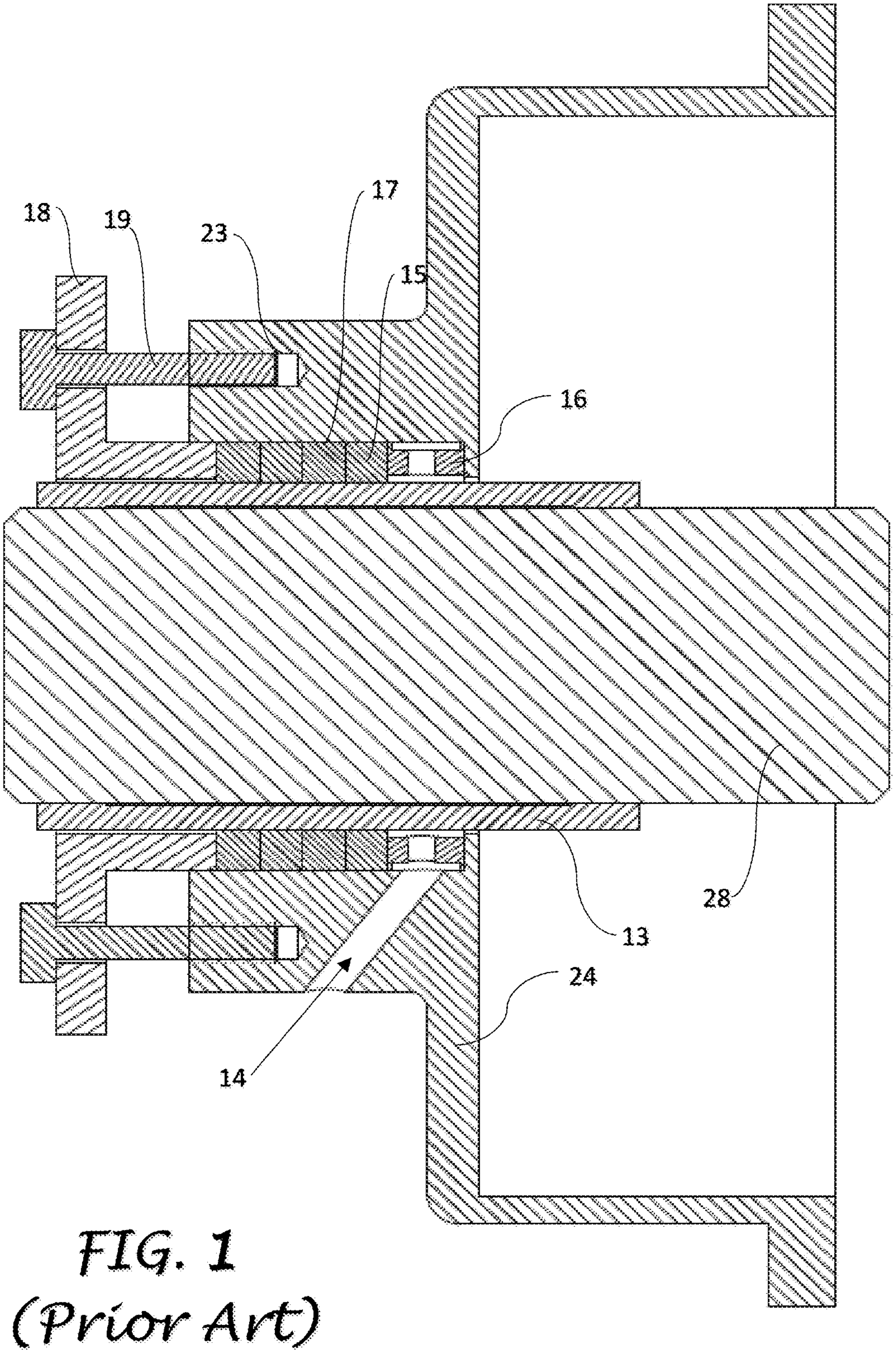
FIG. 1 (Prior Art)
FIG. 1 is a side-sectional view of the prior art illustrating a conventional, compressed mechanical rope packing seal using fresh flush water.

In a side-sectional view shown in FIG. 1 of a prior art slurry seal assembly shows a exemplary shaft-sleeve (13) rotating with a exemplary, pump drive-shaft (28) about a center-axis of rotation (20) as it protrudes thru a stationary, exemplary stuffing-box (24). A exemplary, stuffing-box bore (17) further contains a rope-packing (15) that is compressed in a bore using bolts (19) that thread into a complementary, exemplary stuffing-box threaded bolt-circle (23) and adjust a exemplary gland-follower (18) to mechanically compress the rope-packing (15) in the exemplary stuffing-box bore (17) to create a seal in the inner bore against slurry arriving from a processing-side (29) as practiced by those skilled in the art. The prior art FIG. 1 also includes a pressurized, flush-water porting (14) to introduce pressurized water through a exemplary, flush-water lantern-ring (16) to the processing-side (29) of the rope-packing (15).

Figure 2:
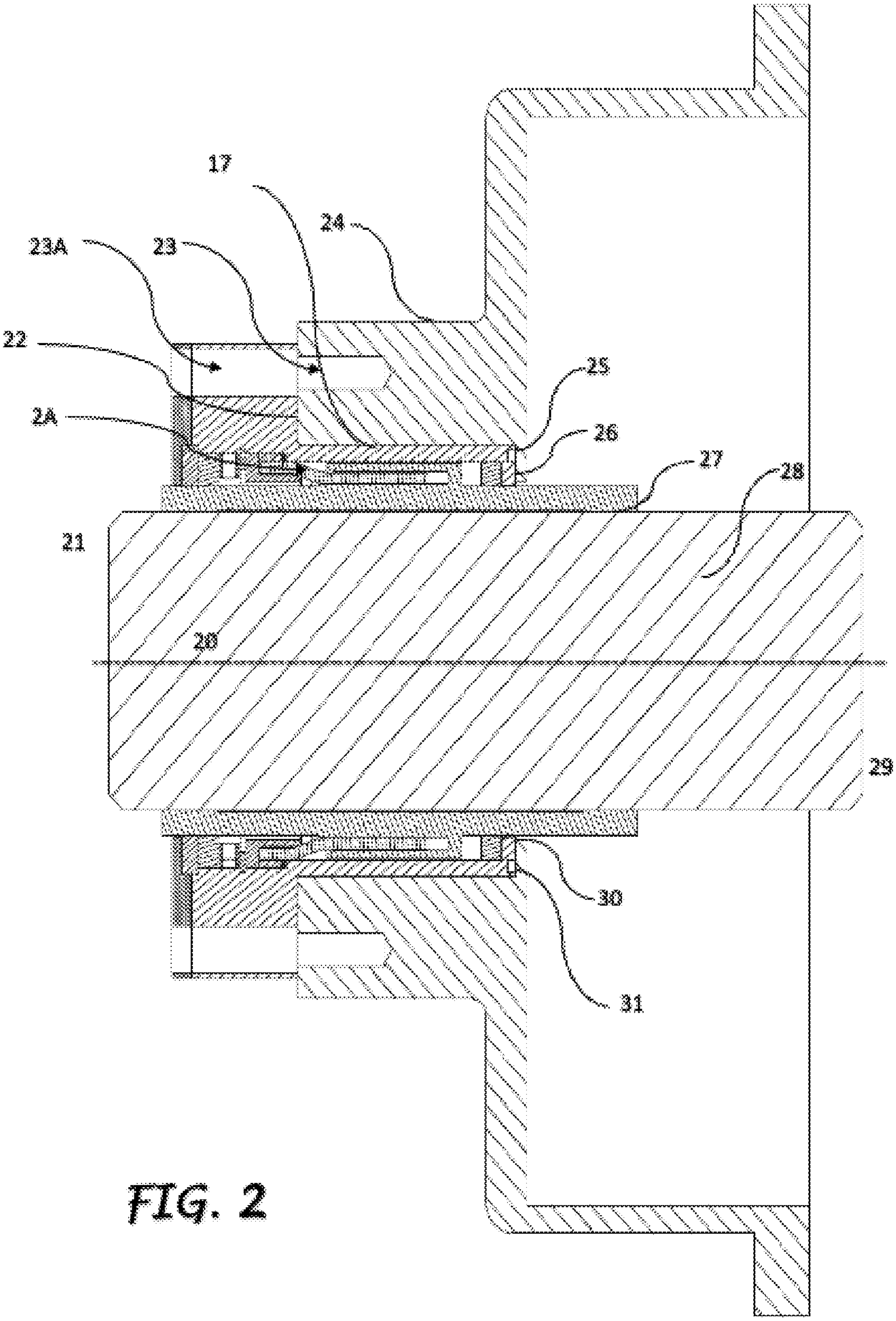
FIG. 2 is a side-sectional view of the prior art/exemplary stuffing box shown with an inventive waterless-gland assembly provided in accordance with the invention in a first preferred embodiment.

In FIG. 2 a waterless-gland assembly (1) in its preferred embodiment, is shown replacing the prior art seal assembly in FIG. 1. The drop-in waterless-gland assembly (1) uses multiple interface design options when interfacing with a wide variety of OEM pumps and is particularly suitable for, but not limited to, service with OEM pump manufacturers such as: KREBBS/FL SCHMIDT, WIER, ASH, WORMAN, GIW and GOULD.

Referring now to FIGS. 2, 3, 4, 5, and 6, In the first preferred embodiment shows the waterless-gland assembly (1) comprising a modular assembly adapted to an exemplary pumping system and is preferably adapted to an in-field, existing, on-site slurry pumping system. The modular waterless gland assembly (1) comprises custom-fabricated, numerous components disposed in a preferably annular assembly for sealing the customer-provided, exemplary, pump drive-shaft (28) and associated exemplary stuffing-box (24).

Referring to FIGS. 2, 3 and 7A and 7B the waterless-gland assembly (1) is interfaced to a exemplary stuffing-box bore (17) with a primary gland-body, bore-fitting surface (40) and uses a primary shaft-sleeve (3) which is rigidly coupled to the exemplary, pump drive-shaft (28) about the center-axis of rotation (20). In a first preferred embodiment, critical portions of the outside diameter on the primary shaft-sleeve (3) are preferably coated with a hard coating, and more preferably a diamond-like film (CrN+DLC) (56) to provide durable, low-friction sealing surfaces.

Figure 3:
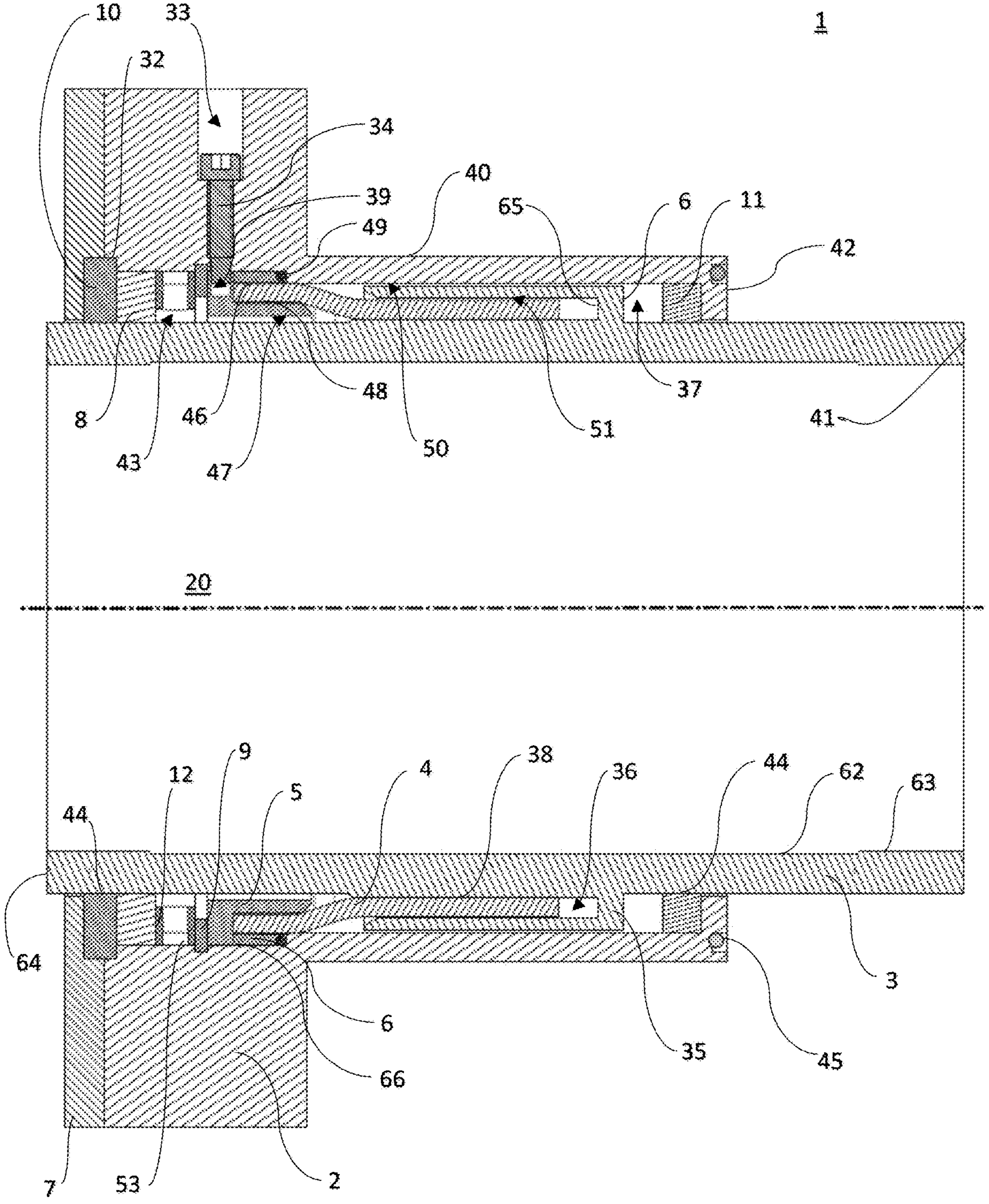
FIG. 3 is a side-sectional view of the invention wherein a waterless-gland assembly is provided in accordance with the invention in a first preferred embodiment.
Figure 4:
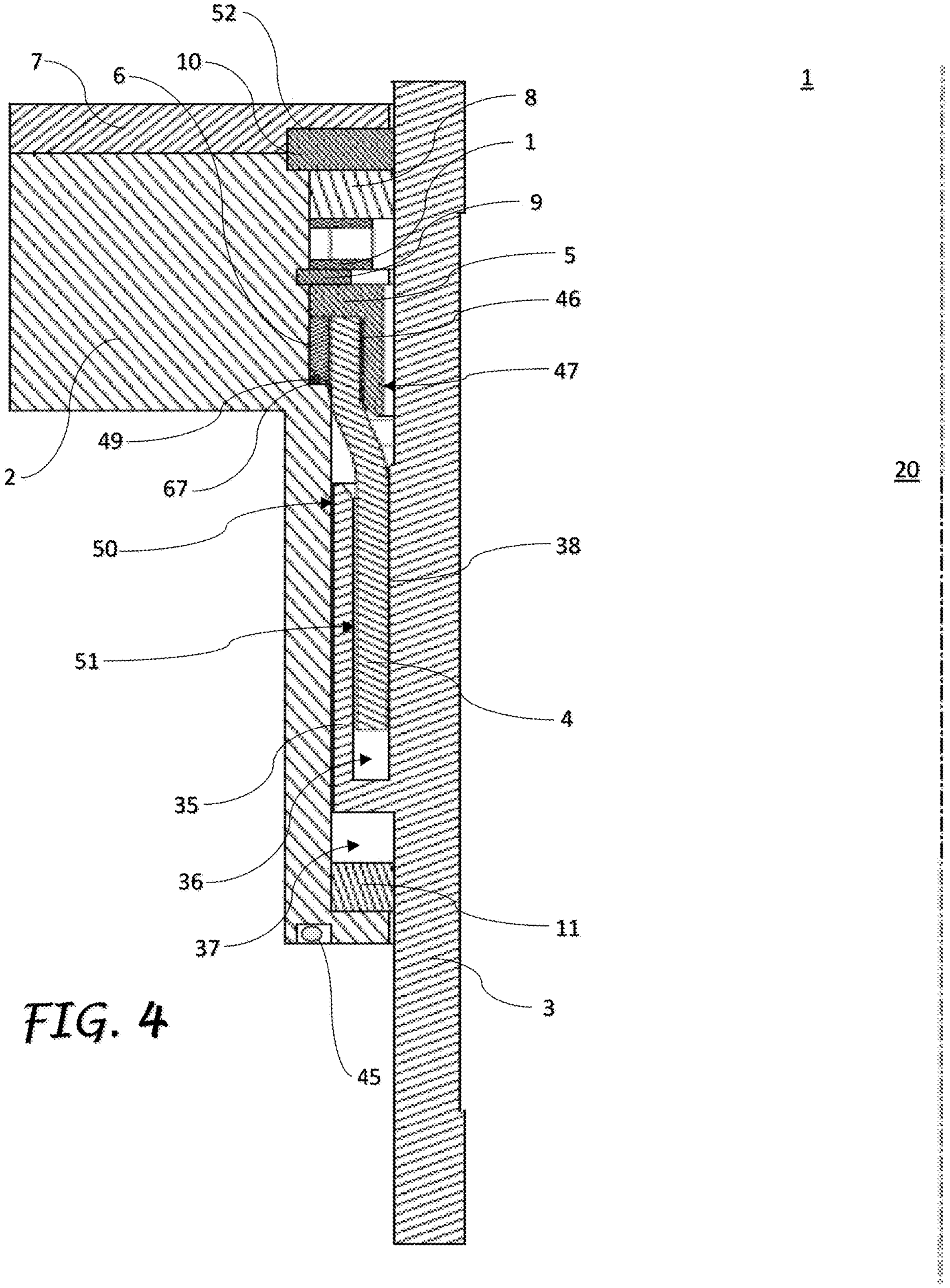
FIG. 4 is a symmetrical side-sectional view of the invention wherein a waterless-gland assembly is provided in accordance with the invention in a first preferred embodiment.

Referring now to FIGS. 1, 2 and 3, the waterless-gland assembly (1) is adapted as an assembly to the existing exemplary pump drive-shaft (28) by radially joining a primary shaft-sleeve, pump-shaft, mating-surface (63) to a exemplary pump drive-shaft annular, shaft-sleeve mating-surface (27) and having a tight, slip-fit radial-tolerance. Accordingly, a primary shaft-sleeve, pump-shaft clearance-cavity (62) provides bore-fitting relief for case of installation. The waterless gland assembly (1) is typically adapted so as to be directly interchangeable with a pre-existing slurry seal or rope packing. The waterless-gland assembly (1) is accordingly constructed so as to be dimensionally fitted within these pre-existing exemplary stuffing-box (24) surfaces: the exemplary stuffing-box bore (17), a exemplary, stuffing-box fastener mating-surface (22) and a exemplary stuffing-box bore shoulder (26). Once the waterless-gland assembly (1) is mated with the exemplary stuffing-box (24) it cannot be readily displaced from its resting position without a substantial force due to the plurality of bolts (19) fastening the waterless-gland assembly (1) to the stuffing-box threaded bolt-circle (23), as is commonly practiced by those skilled in the art. The primary gland-body (2) preferably, comprises a monolithic form but can be constructed of multiple interconnected pieces in an alternative embodiment. The primary components of the waterless gland assembly (1) are preferably formed from 316 or 304 stainless steel to prevent corrosion during operation Referring again to FIGS. 2, 3, 7A and 7B a primary gland-body O-ring (45) is disposed into a primary gland body, O-ring cavity (31) of a primary gland-body (2), and will mate with the exemplary, stuffing-box bore-shoulder mating surface (26). The clearance between a primary, gland-body, sealing-surface (42) and the bore shoulder mating-surface (26) is a resistance fit so as to hermetically seal a sealing surface (26A) at the base of the primary gland-body (2) to the bore shoulder (26) thereby occluding the passage of slurry fluid between the waterless-gland assembly (1) and the exemplary, stuffing box bore (17).

For purpose of the present application, the term "slurry" is understood to include liquids with or without particles capable of wearing the sealing surfaces. The slurry inherently comprises exceedingly abrasive mixtures that are frequently encountered in mining operations for which the presently embodied waterless-gland assembly (1) is well-suited.

Referring now to FIGS. 2, 8A, 8B and 8C a waterless-gland assembly (1) is shown disposed about the rotatable, exemplary, pump drive-shaft (28) between the process-side (29) and a atmosphere-side (21) of the pump scaling area. The primary shaft-sleeve (3) is a cylindrical structure attached to the exemplary, pump drive-shaft (28) by axial compression enabling the primary shaft-sleeve (3) to rotate with the exemplary, pump drive-shaft (28) about the center-axis of rotation (20).

Referring again to FIGS. 2, 3, 8A, 8B and 8C the primary shaft-sleeve (3) is axially located and secured to the exemplary pump shaft (28) in a compression fit using a primary shaft-sleeve atmosphere-side, axial, compression-surface (64) and a primary shaft-sleeve, impellor, mating-surface (41) which ensures the proper location and registration of the waterless-gland assembly (1) in an OEM pumping system. Rotation may be either clockwise or counter clockwise as required and suitable for the application.

Referring again to FIG. 2, the exemplary pump, drive-shaft (28) may be attached to or communicable with a motor or other drive means (not shown) at the atmosphere-side (21). The exemplary pump, drive-shaft (28) also may be attached to a component facilitating transport of a slurry between input and output ends at the process-side (29). In one example, the waterless-gland assembly (1) could be disposed along the exemplary pump, drive-shaft (28) within a slurry pump whereby the exemplary pump, drive-shaft (28) is attached at the atmosphere-side (21) to an electric or gas-powered motor internal or external to the pump and the process-side (29) to an impeller.

Now referring to FIGS. 2, 3, 15A, 15B, 16A and 16B the waterless-gland assembly (1) alignment is ensured between the waterless-gland assembly (1), the exemplary pump, drive-shaft (28) and the exemplary stuffing-box (24) by means of a process-side alignment-bushing (11) and a atmosphere-side alignment-bushing (10). The process-side alignment-bushing (11) is press-fit in the primary gland-body (2) in assembly, preventing rotation of the bushing during pump operation. Accordingly, a process-side alignment-bushing internal mating-surface (44) will wear, allowing some flow of slurry to enter the waterless-gland assembly (1) from the process-side (29) through a stuffing-box throat (slurry passage) (30) into a axial-adjustment cavity (37).

Figure 5:
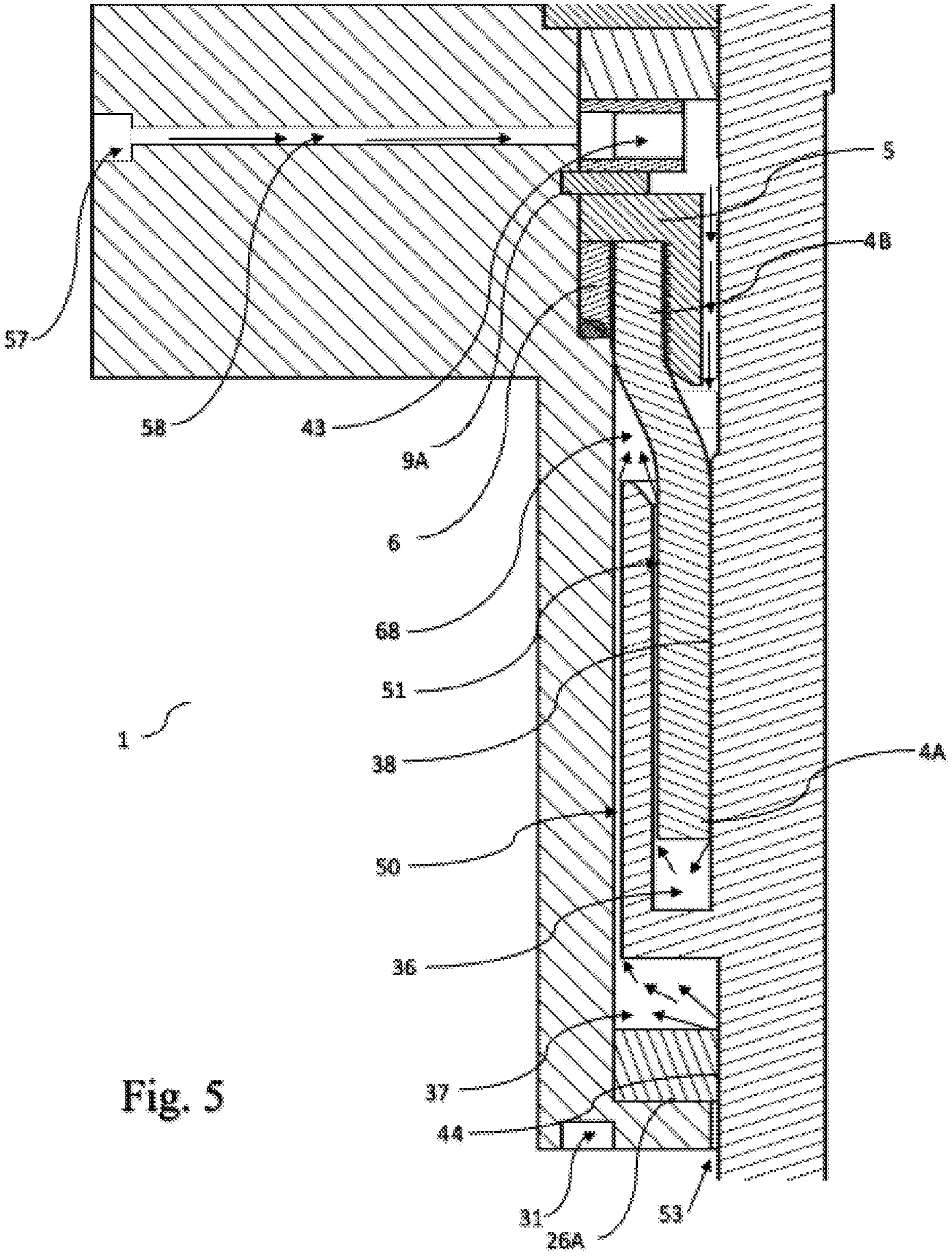
FIG. 5 is a symmetrical side-sectional view of the invention wherein a slurry flow is described in combination with the flow of the internal lubrication in the waterless-gland assembly in its preferred embodiment.
Figure 6:
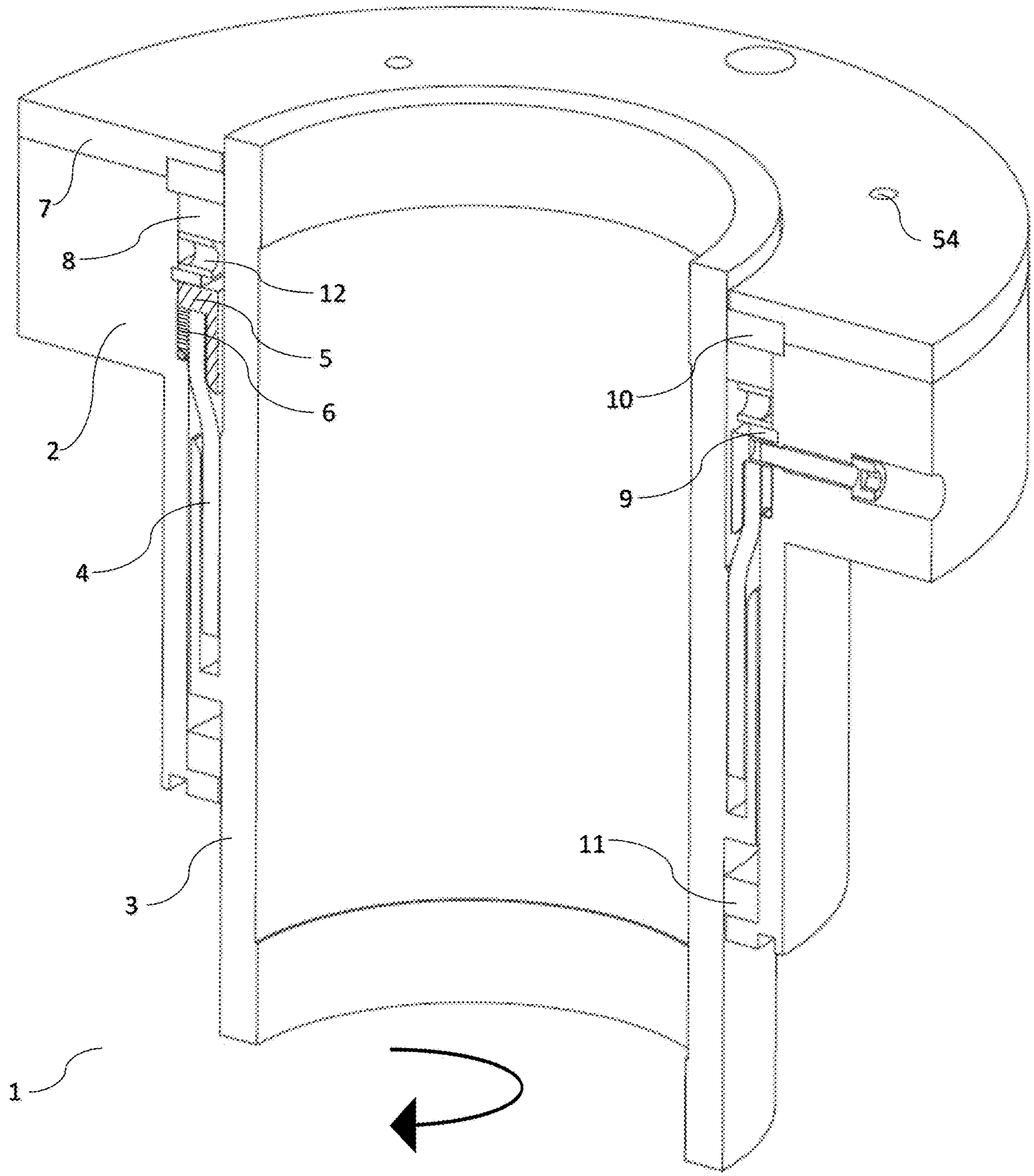
FIG. 6 is a perspective side-sectional view of the invention wherein a waterless-gland assembly is provided in accordance with the invention in a first preferred embodiment.
Figure 7A:
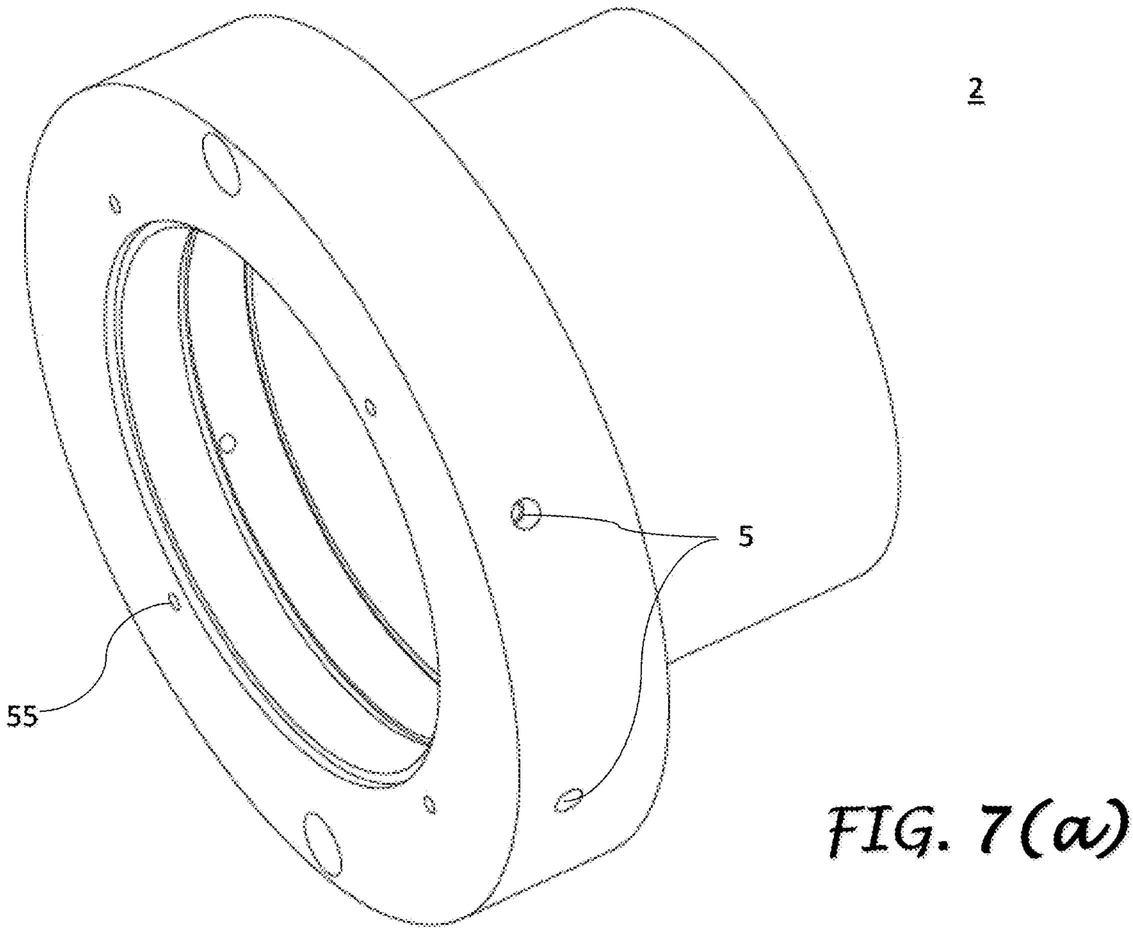
FIG. 7A is a perspective view of a primary gland body of the invention in its first preferred embodiment.
Figure 7B:
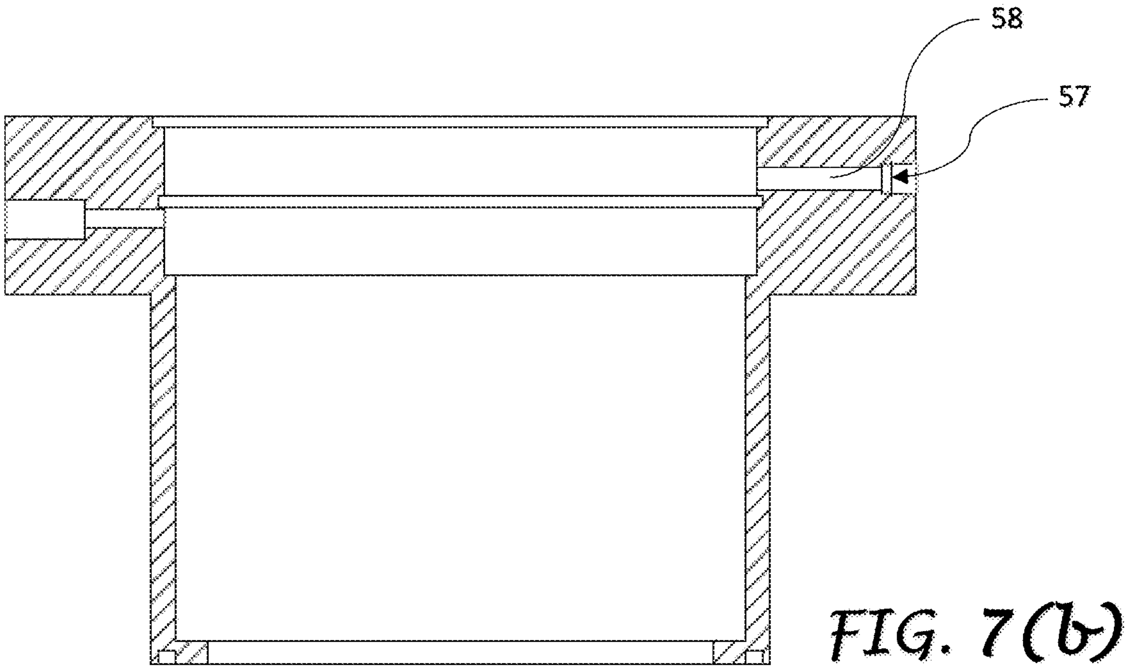
FIG. 7B is a a side-sectional view of a primary gland body of the invention in its first preferred embodiment.
Figure 8A:
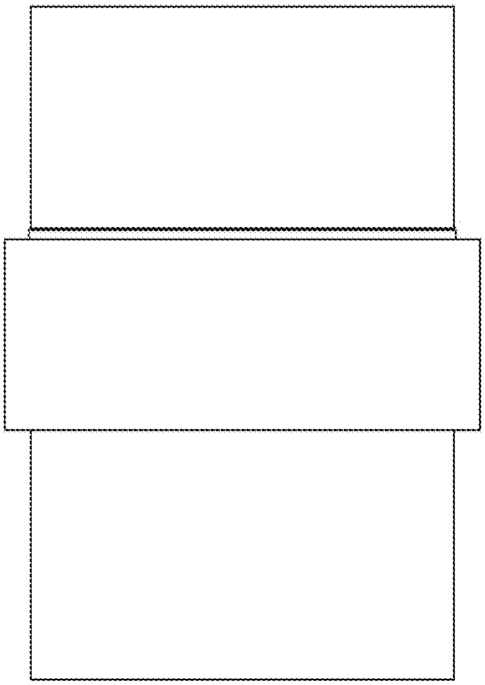
FIG. 8A is a a side view of a primary shaft sleeve of the invention in its first preferred embodiment-.
Figure 8B:
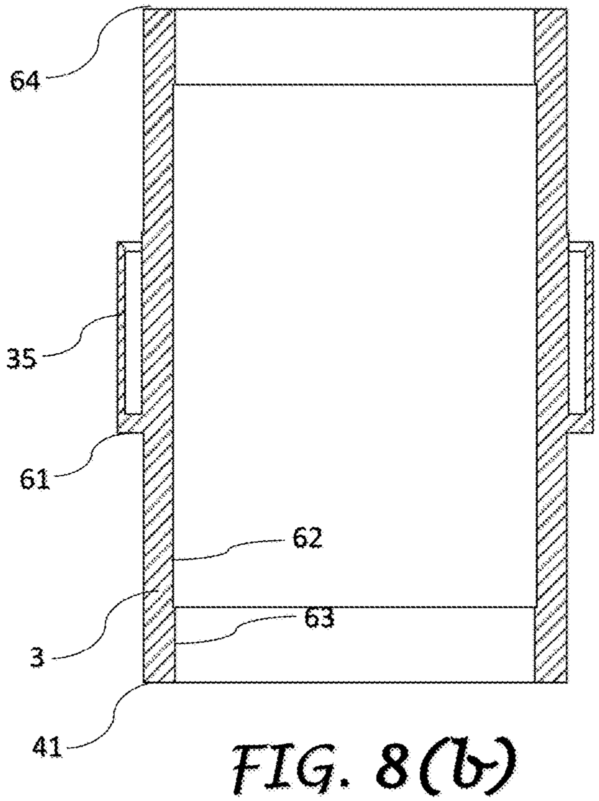
FIG. 8B is a side-sectional view of a primary shaft sleeve of the invention in its first preferred embodiment.
Figure 6C:
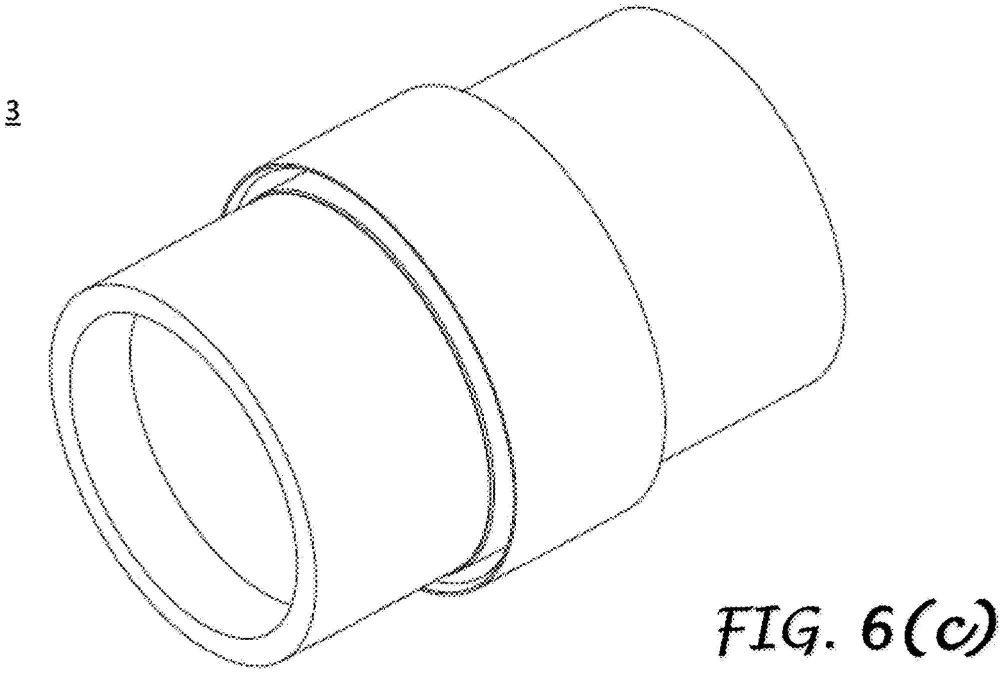
Figure 9A:
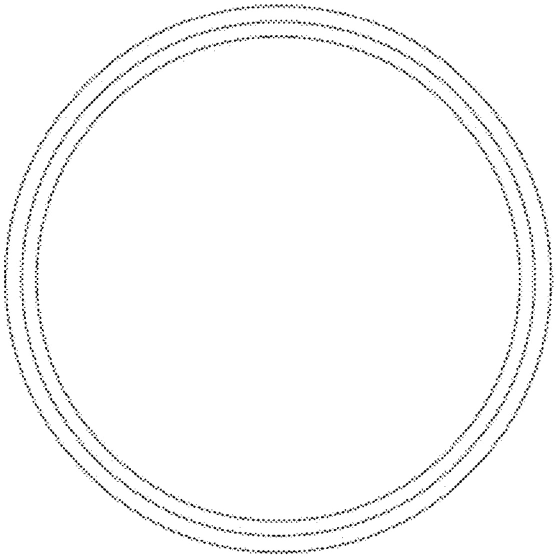
FIG. 9A is a top view of an elastomeric boot of the invention in its first preferred embodiment.
Figure 9B:
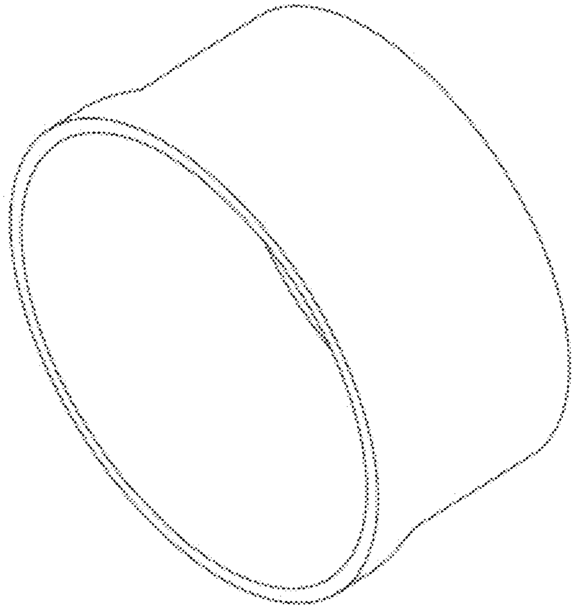
FIG. 9B is a perspective view of an elastomeric boot of the invention in its first preferred embodiment.
Figure 9C:
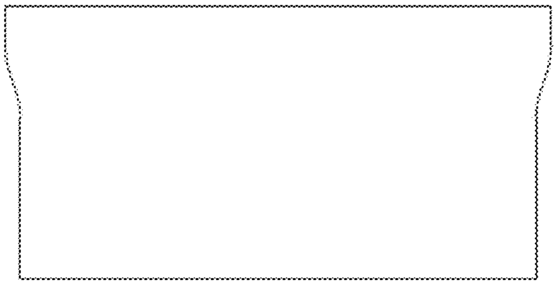
FIG. 9C is a side view of an elastomeric boot of the invention in its first preferred embodiment.
Figure 12A:
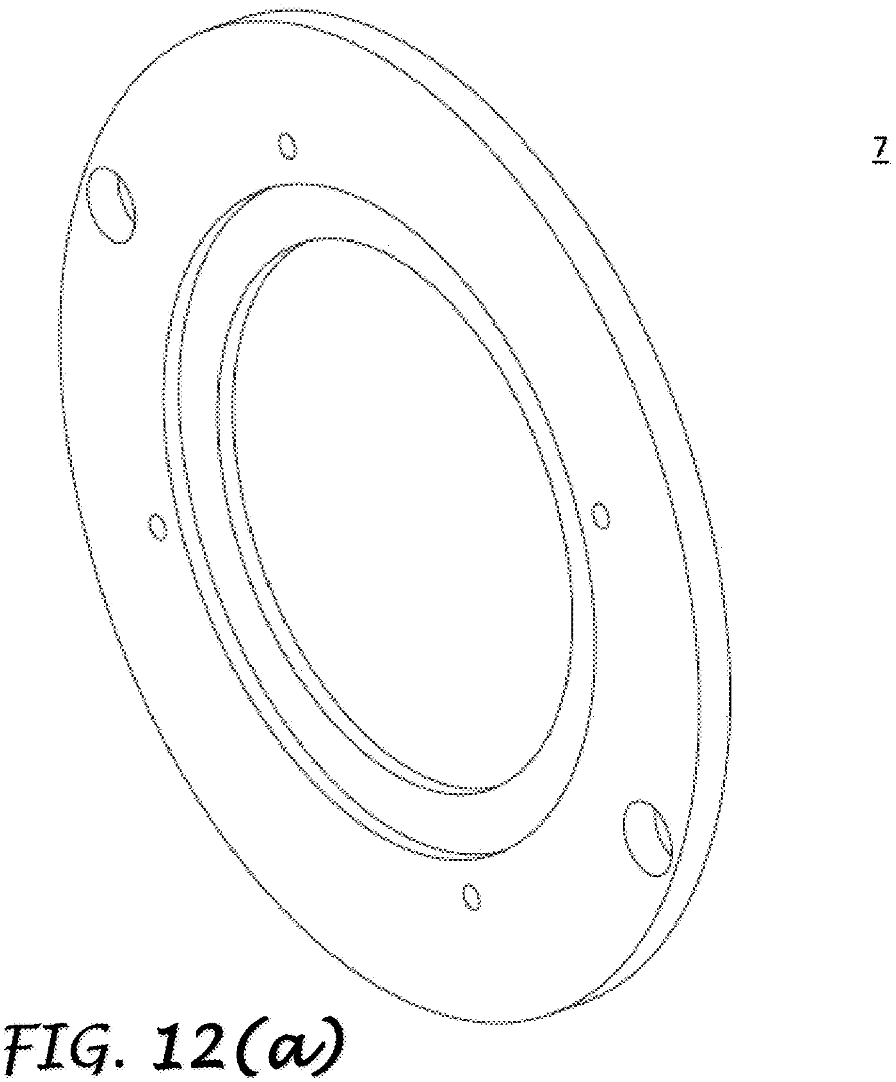
FIG. 12A is a perspective view of a primary gland body flange of the invention in its first preferred embodiment.
Figure 12B:
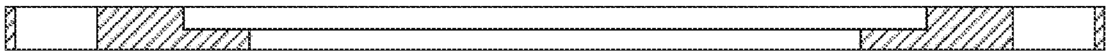
FIG. 12B is a side-sectional view of a primary gland body flange of the invention in its first preferred embodiment.
Figure 13A:
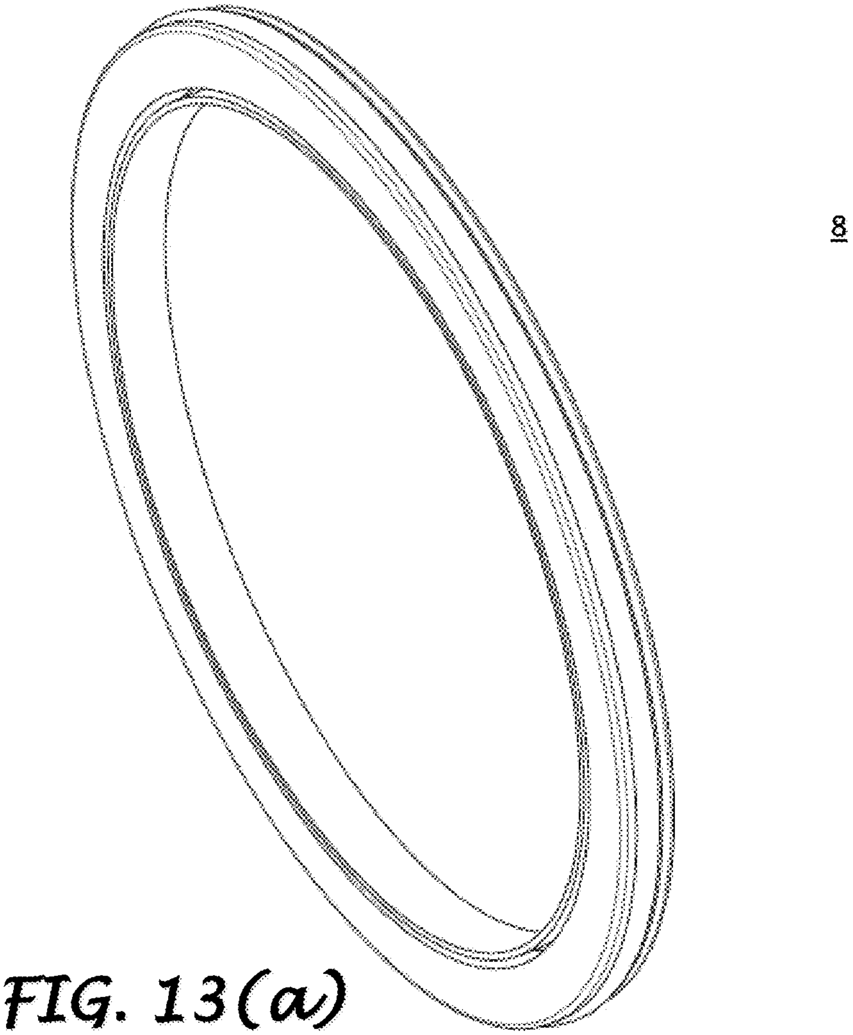
FIG. 13A is a perspective view of a rotary high-pressure lip seal of the invention in its first preferred embodiment.
Figure 13B:
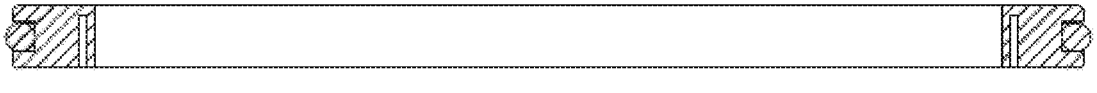
FIG. 13B is a side-sectional view of a rotary high-pressure lip seal of the invention in its first preferred embodiment.
Figure 15A:
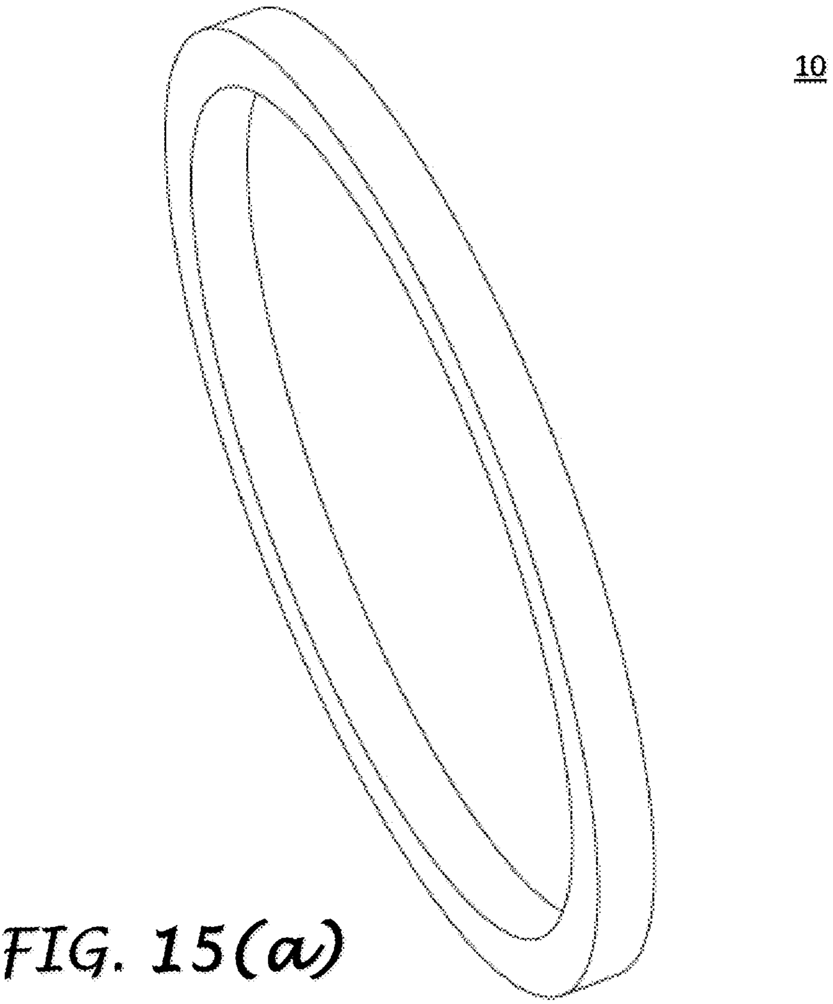
FIG. 15A is a perspective view of an atmosphere side alignment bushing of the invention in its first preferred embodiment.
Figure 15B:
FIG. 15B is a side-sectional view of an atmosphere side alignment bushing of the invention in its first preferred embodiment.
Figure 16A:
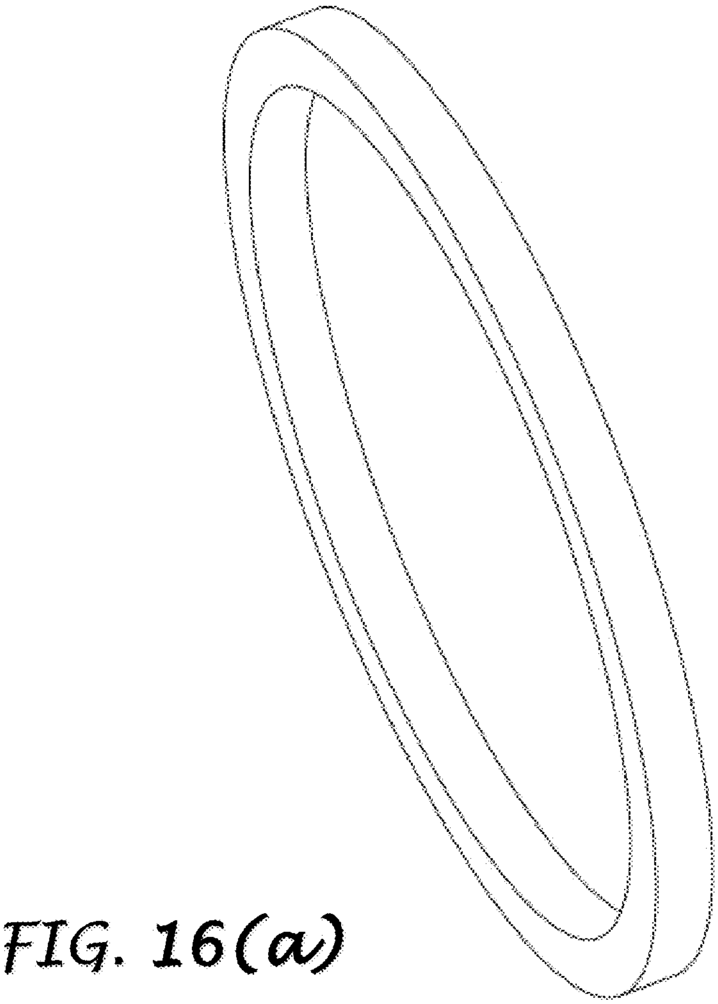
FIG. 16A is a perspective view of a process side alignment bushing of the invention in its first preferred embodiment.
Figure 16B:
FIG. 16B is a side-sectional view of a process side alignment bushing of the invention in its first preferred embodiment.

Referring now to FIGS. 2 and 5 For purpose of the present application, the term "chamber" encompasses and describes the entirety of all cavities, gaps and voids between a threaded grease-port (57) and the process-side (29) of the waterless-gland assembly (1). The entire chamber of the waterless-gland assembly (1) is substantially purged with grease and will continue to be replenished with grease throughout the lifespan of the waterless-gland assembly (1) from the grease dispensing unit (not shown), which may be a gas-charged, electromechanical or spring-loaded automatic grease dispensing unit providing an inclusive means by which to lubricate the waterless-gland assembly (1) with metered injections; eliminating the need for manual lubrication and maintenance.

Referring now to FIGS. 3, 4, 6, 7A, 7B, 8A, 8B, 8C, 12A, 12B, 13A, 13B, 15A, 15B, 16A and 16B the primary gland body flange (7) provides axially compression to a atmosphere-side alignment-bushing axial compression-surface (52) of the atmosphere-side alignment-bushing (10) thereby preventing the rotation or axial movement of the alignment bushing (10). The primary gland-body flange bolt-circle (54) is fastened to the primary gland-body (2) using the primary gland-body threaded bolt-circle (55) via a plurality of fasteners. Accordingly, atmosphere-side alignment bushing is radially defined by a atmosphere-side alignment-bushing radial-interface (32).

The bushings (10,11) also establish concentricity and radial alignment between a rotary, high-pressure lip-seal (8) and the primary shaft-sleeve (3) eliminating side-loading during operation about the center-axis of rotation (20). Accordingly, said alignment bushings provide alignment between the gland body (2) and the shaft sleeve (3) that is maintained once the exemplary stuffing-box (24) is secured by a plurality of fasteners to the process-side (29) impellor housing (not shown) during installation.

Referring again to FIGS. 2, 3, 4, 6, 7A, 7B, 9A, 9B, 9C, 10A, 10B, 11A, 11B, 14A and 14B, a elastomeric boot (4), a single, homogeneous, elastomeric member, in its first preferred embodiment, has a first end 4A that fits into the annular receptacle 36 and a second end 4B that is captured by its internal diameter on its atmosphere end by a annular boot-keeper compression surface (48) of the annular boot-keeper (5) providing a radially engaging, stretch-to-fit surface and compressed on its outside diameter to the annular boot-keeper (5) with a annular boot-keeper compression ring inner mating surface (46) of a annular boot-keeper compression ring (6) providing radial compression, whereby, friction-locking the elastomeric boot (4) between these two components, composing a boot capturing assembly (labyrinth keeper). The labyrinth keeper is bore fitted to a primary gland-body counter-bore (66) of the primary gland-body (2) and axially located by a annular boot-keeper compression-ring locating-shoulder (67) hermetically sealing the boot keeper assembly against the passage of slurry from the process-side (29) using a annular boot-keeper compression-ring, axial O-ring (49). Accordingly, the annular boot-keeper (5) is axially retained and affixed by a boot-keeper retaining ring (9) that fits in a retaining ring channel (9A) which also provides compression for the compression ring axial O-ring (49). The annular boot-keeper (5) is also secured in rotation in the counterbore (66) by a annular boot-keeper anti-rotational shoulder-bolt (34) which is affixed to the primary gland-body (2) by engaging the anti-rotational shoulder bolt (34) in a primary gland-body, anti-rotational, shoulder-bolt cavity (33) and substantially filling a annular boot-keeper, anti-rotational, shoulder-bolt cavity (39). The elastomeric boot (4) is captured by the annular boot-keeper (5) in assembly and is now provided with radial and axial alignment.

Referring now to FIGS. 3, 6, 8A, 8B, 8C, 9A, 9B and 9C, the primary shaft-sleeve (3) is formed with a labyrinth-housing (35) comprising a cylindrical wall that is spaced away from a primary shaft-sleeve compression sealing-surface (38), a shaft-sleeve radial-extension (61) and joined to the primary shaft-sleeve (3), creating between them a shaft sleeve annular receptacle (labyrinth cavity) (36). The radially collapsible elastomeric boot (4) is interposed in and substantially filling the annular receptacle (36) and having a radial compressive force about the sealing-surface (38).

Referring now to FIGS. 2, 3, 4, 5, 17A and 17B at least one pressurized grease-feedthrough channel (58) communicates with a grease dispensing unit at the atmosphere-side (21) which purges all of the cavities, gaps and voids of the inner chamber (2A) with grease or other viscous, water-insoluble material. The pressurized grease traverses through a lantern-ring grease feedthrough-ports (43) and through a lantern-ring, radial grease-cavity (60) of a lantern ring (12) filling the entire chamber of the waterless-gland assembly (1) to the process-side (29). The rotary, high-pressure lip-seal (8) prevents the passage of the grease to the atmosphere-side (21). In its preferred embodiment, the grease pressure is higher than the pressure within the process-side (29) so as to impede the slurry's upstream flow from the process-side (29) to the atmosphere-side (21).

Referring now to FIGS. 2, 3, 4, 5, 6, 9A, 9B and 9C, the axial-adjustment cavity (37) of the waterless-gland assembly (1) provides the necessary axial movement during installation to ensure proper mechanical clearances and accordingly acts as a cavity, wherein, the grease and slurry particulates combine in a process that creates a clotting effect through the grease's ability to separate the slurry particulates from the carrying liquid due to the grease's resistance to water washout. This combination of grease and slurry particulates will form a compound that creates a restrictive barrier further impeding upstream flow by the slurry from the stuffing-box throat (slurry passage) (30) and a waterless-gland assembly process-side slurry throat (53) towards the atmosphere-side (21) of the waterless-gland assembly (1). The portion of slurry that continues past the axial-adjustment cavity (37) towards the atmosphere-side (21) is significantly reduced in flow and volume due to the restrictive gap of a labyrinth-housing, rotational clearance-cavity (50), preferably, less than. 030" radially. The remaining, residual portion of slurry that traverses the labyrinth-housing, rotational clearance-cavity (50) will enter a residual, slurry-barrier cavity (68). Additionally, a elastomeric-boot, radial-clearance cavity (51) communicates a pressurized grease medium from the atmosphere-side (21) to further prevent the upstream flow by the residual slurry material originating from the process-side (29). The labyrinth effect created by the elastomeric boot (4) in a constant radially compressive force with the compression sealing surface (38) and integrated into the annular receptacle (labyrinth cavity) (36) will prevent the remaining slurry from further traversing toward the atmosphere-side 21 of the waterless-gland assembly (1).

Referring again to FIGS. 1, 2, and 3, the lubrication pressure from the atmosphere-side (21) and tolerances between internal components of the waterless-gland assembly (1) required to resist flow of slurry from the process-side (29) are application dependent and based on a variety of factors including but not limited to; the density, composition, velocity and pressure within the process-side (29).

The invention may be used within a variety of applications wherein a fluid is movable between an inlet and an outlet. One specific, non-limiting example is a slurry pump wherein a seal assembly is required about a rotatable shaft to prevent leakage between a process-side (29) and an atmosphere-side (21) and the seal assembly must resist premature wear of sealing components by abrasive particles.

The description above indicates that a great degree of flexibility is offered in terms of the present invention. Therefore, the scope of the appended claims should not be limited to the descriptions of the preferred versions contained herein.

What is claimed is:

1. A gland seal configured to be accommodated within a stuffing box bore of a stuffing box, the stuffing box having at least one bolt circle and the stuffing box bore having a stuffing box mating surface, the gland seal to seal against the passage of slurry between a housing and a rotating solid shaft from a process side to an atmosphere side, the gland seal comprising:

a gland body having a flange with at least one bolt hole aligned with the at least one bolt circle, wherein the gland body defines a cavity that accommodates a shaft-sleeve configured to accommodate the rotating solid shaft, the shaft-sleeve having an inner shaft mating surface and an outer surface;

a radial extension extending from the outer surface of the shaft-sleeve to form an annular receptacle; and an elastomeric boot having a first end portion that fits into the annular receptacle and a second end portion that fits into an annular boot keeper that rests on an annular boot keeper compression surface when the first end portion is fully inserted into the annular receptacle;

wherein the second end portion is offset from the first end portion when the annular boot keeper rests on the annular boot keeper compression surface.

2. The gland seal of claim 1, wherein a surface of the cavity comprises a channel to accommodate a retaining ring that presses against the boot keeper to retain the elastomeric boot in position.

3. The gland seal of claim 1, further comprising an alignment bushing on at least one of a process side of the gland body and an atmosphere side of the gland body.

4. The gland seal of claim 1, further comprising a pressurized grease feedthrough in the gland body that feeds grease into a chamber.

5. The gland seal of claim 1, further comprising an axial adjustment cavity between a process side of the gland body and the shaft sleeve.

6. The gland seal of claim 1, further comprising an annular boot-keeper compression ring that compresses the elastomeric boot against the annular boot keeper.

7. The gland seal of claim 6, wherein the cavity comprises a counter-bore and the annular boot-keeper compression ring comprises a ring seal that creates a hermetic seal between the counter-bore and the annular boot-keeper compression ring.

8. The gland seal of claim 1, wherein the gland body comprises a sealing surface that contacts the stuffing-box mating surface, and wherein the sealing surface has an O-ring cavity that accommodates a ring seal that creates a hermetic seal between the sealing surface and the stuffing box mating surface when the gland seal is installed.

9. A gland seal configured to be accommodated within a stuffing box bore of a stuffing box with at least one bolt circle, the gland seal to seal a slurry on a process side from passing along a rotating shaft to an atmosphere side, the stuffing box comprising:

a primary gland body having a primary cavity and a flange with at least one bolt hole aligning with the at least one bolt circle;

a primary shaft sleeve having an external surface and a cylindrical internal shaft mating surface to accommodate the rotating shaft;

a labyrinth housing having a housing outer surface and extending from the external surface to define a radial labyrinth cavity having a proximal interior cavity surface and a distal interior cavity surface that accommodates a first end portion of an elastomeric boot having a boot proximal surface and a boot distal surface, and wherein the boot is configured to form a radial-clearance cavity between the distal interior cavity surface and the boot distal surface;

wherein the elastomeric boot has a length and a thickness and wherein the length is a multiple of the thickness.

10. The gland seal of claim 9, wherein the primary cavity has a channel to accommodate a retaining ring that presses against a boot keeper to retain the elastomeric boot in position.

11. The gland seal of claim 9, further comprising an alignment bushing on at least one of a process side of the primary gland body and an atmosphere side of the primary gland body.

12. The gland seal of claim 9, further comprising a pressurized grease feedthrough in the primary gland body that feeds grease into the primary cavity.

13. The gland seal of claim 9, further comprising an axial adjustment cavity between a process side of the primary gland body and the primary shaft sleeve.

14. The gland seal of claim 9, further comprising an annular boot-keeper compression ring that compresses the elastomeric boot against an annular boot keeper.

15. The gland seal of claim 14, wherein the primary cavity comprises a counter-bore and the annular boot-keeper compression ring comprises a ring seal that creates a hermetic seal between the counter-bore and the boot-keeper compression ring.

16. The gland seal of claim 9, wherein the primary gland body comprises a sealing surface that contacts a stuffing box bore shoulder mating surface, and wherein the sealing surface has an O-ring cavity that accommodates a ring seal that creates a hermetic seal between the sealing surface and the stuffing box bore shoulder mating surface when the gland seal is installed.

17. A seal to prevent passage of a slurry from a process side to an atmosphere side of an assembly of a stuffing box having a stuffing box bore and at least one bolt circle, a primary gland body having a primary cavity and a flange with at least one bolt hole aligning with the at least one bolt circle, a primary shaft sleeve having a compression sealing surface and a cylindrical internal shaft mating surface to accommodate a rotating shaft, the seal comprising:

a labyrinth housing having a housing outer surface and extending from the external surface to define a radial labyrinth cavity having a proximal interior cavity surface and a distal interior cavity surface a labyrinth housing having a housing outer surface and extending from the external surface to define a radial labyrinth cavity having a proximal interior cavity surface and a distal interior cavity surface that accommodates a radially collapsible elastomeric boot having a boot proximal surface and a boot distal surface, and wherein the boot and labyrinth housing are configured to form a radial-clearance cavity between the distal interior cavity surface and the boot distal surface; and wherein the primary gland body is bored to fit the primary shaft sleeve within the primary cavity.

18. The seal of claim 17, further comprising a pressurized grease feedthrough in the primary gland body that feeds grease into the primary cavity.

19. The gland seal of claim 9, further comprising a high-pressure lip seal that engages the external surface of the primary shaft sleeve and creates a seal between the atmosphere side and the elastomeric boot.

20. The gland seal of claim 19, wherein at least a portion of the external surface of the primary shaft sleeve is coated with a hard coating.

* * * * *